US007211975B2

(12) United States Patent
Murray et al.

(10) Patent No.: US 7,211,975 B2
(45) Date of Patent: May 1, 2007

(54) MOTORIZED BARRIER OPERATOR SYSTEM ADAPTABLE TO DIFFERENT SAFETY CONFIGURATIONS AND METHODS FOR PROGRAMMING THE SAME

(75) Inventors: James S. Murray, Milton, FL (US); Paul J. VanDrunen, Navarre, FL (US)

(73) Assignee: Wayne-Dalton Corp., Mt. Hope, OH (US)

(*) Notice: Subject to any disclaimer, the term of this patent is extended or adjusted under 35 U.S.C. 154(b) by 527 days.

(21) Appl. No.: 10/781,248

(22) Filed: Feb. 18, 2004

(65) Prior Publication Data

US 2004/0164693 A1 Aug. 26, 2004

Related U.S. Application Data

(63) Continuation-in-part of application No. 10/142,642, filed on May 10, 2002, now Pat. No. 6,873,127.

(51) Int. Cl.
*H02P 3/00* (2006.01)

(52) U.S. Cl. ................ 318/286; 318/466; 340/825.57; 49/26; 49/28

(58) Field of Classification Search ................ 318/466, 318/286; 340/825.57; 49/26, 28
See application file for complete search history.

(56) References Cited

U.S. PATENT DOCUMENTS

| | | | | |
|---|---|---|---|---|
| 3,868,000 | A * | 2/1975 | Spear et al. | 187/317 |
| 5,109,221 | A * | 4/1992 | Lambropoulos et al. | 340/5.22 |
| 5,428,923 | A | 7/1995 | Waggamon | 49/28 |
| 5,465,033 | A | 11/1995 | Fassih-Nia | 318/480 |
| 5,864,297 | A * | 1/1999 | Sollestre et al. | 340/5.23 |
| 5,929,580 | A * | 7/1999 | Mullet et al. | 318/466 |
| 6,161,438 | A | 12/2000 | Mullet et al. | 73/774 |
| 6,316,763 | B1 * | 11/2001 | Appleyard et al. | 250/221 |
| 6,326,754 | B1 * | 12/2001 | Mullet et al. | 318/480 |
| 6,660,993 | B2 * | 12/2003 | Appleyard et al. | 250/221 |
| 6,667,591 | B2 * | 12/2003 | Mullet et al. | 318/445 |
| 2003/0102836 | A1 | 6/2003 | McCall | 318/445 |
| 2003/0201743 | A1 | 10/2003 | Study | 340/686.6 |
| 2003/0210005 | A1 | 11/2003 | Murray | 318/286 |

FOREIGN PATENT DOCUMENTS

| | | | |
|---|---|---|---|
| EP | 0 396 453 | A1 | 4/1990 |
| EP | 1 304 442 | A2 | 4/2003 |
| WO | WO03093910 | A2 | 11/2003 |

* cited by examiner

*Primary Examiner*—Rita Leykin
(74) *Attorney, Agent, or Firm*—Renner Kenner Grieve Bobak Taylor & Weber

(57) ABSTRACT

A motorized barrier operator system is disclosed that is adaptable to different safety configurations. The system is provided with a default configuration that may be changed upon detection of an optional safety configuration by the operator system. The changeover may be accomplished by actuation of a program button upon system power-up or in conjunction with program button actuation and the presence or absence of a jumper associated with a controller of the operator system.

22 Claims, 5 Drawing Sheets

FIG−2

MOTORIZED BARRIER OPERATOR SYSTEM ADAPTABLE TO DIFFERENT SAFETY CONFIGURATIONS AND METHODS FOR PROGRAMMING THE SAME

CROSS-REFERENCE TO RELATED APPLICATION

This is a continuation-in-part of patent application Ser. No. 10/142,642, filed May 10, 2002, now U.S. Pat. No. 6,873,127, entitled "Method And Device For Adjusting an Internal Obstruction Force Setting for a Motorized Garage Door Operator."

TECHNICAL FIELD

Generally, the present invention relates to a movable barrier operator system for use on a closure member moveable relative to a fixed member. More particularly, the present invention relates to an operator-controlled motor for controlling the operation of a closure member, such as a gate or door, between a closed position and an open position. More specifically, the present invention relates to a barrier operator, wherein the operator automatically adjusts a force threshold depending upon whether an external secondary entrapment device is connected to the operator.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired or wireless wall station or other similar device. It is also known to provide safety devices that are connected to the operator for the purpose of detecting an obstruction so that the operator may then take corrective action with the motor to avoid entrapment of the obstruction.

How safety devices are used with a door operator system have evolved from the days of no uniform standard to the currently applied government regulations as embodied in Underwriters Laboratories Standard 325. UL Standard 325 encompasses safety standards for a variety of movable barriers such as gates, draperies, louvers, windows and doors. The standard specifically covers vehicular gate or door operators intended for use with garages and/or parking areas. Such devices require a primary safety system and a secondary safety system which are independent of each other. Primary entrapment systems sense the operator motor's current draw, or motor speed and take the appropriate corrective action if the monitored value is exceeded. Primary systems must be internal within the operator head. Secondary entrapment systems are typically external from the operator head and may include a non-contact or contact type sensor. But, secondary systems may also be internal to the operator head as long as they are independent of the primary system.

One of the more widely used non-contact devices is a photo-electric eye which projects a light beam across the door's travel path. If the light beam is interrupted during closure of the door, the operator stops and reverses the travel of the door. Contact type safety devices such as an edge-sensitive pressure switch, which is attached to the bottom edge of the door and runs the complete width of the door, may also be used. Other contact safety devices directly monitor the operating characteristics of the driving motor to determine whether an obstruction is present. Typically, shaft speed of the motor is monitored by projecting an infrared light through an interrupter wheel. Alternatively, Hall effect switches or tachometers can be used to monitor shaft speed. Or, the motor current could be monitored such that when an excessive amount of current is drawn by the motor—which indicates that the motor is working harder than normal—it is presumed that an obstruction has been encountered. It is also known to monitor door speed with a sliding potentiometer, wherein a rate of change is equated to the speed of the door and wherein unexpected slowing of the door triggers corrective action by the operator. The secondary entrapment requirement may also be met by providing an operator that is capable of receiving continuous pressure on an actuating device that is in the line of sight of the door and maintains the opening or closing motion until the respective limit position is reached. Regardless of how the safety devices work, their purpose is to ensure that individuals, especially children, are not entrapped by a closing door. Opening forces of the door are also monitored to preclude damage to the operating system for instances where an object or individual is caught upon a door panel as the door moves upwardly.

One particular feature of the standard requires that when an operator controls a pinch-resistant door and an external secondary entrapment device is not connected to the operator, then a fifteen pound obstruction force threshold setting must be used. In other words, if no external secondary entrapment device is attached to the operator but instead an internal secondary entrapment device is used, then the maximum force that the motor is allowed to apply to the door—in a closing direction—is fifteen pounds. But, if an external secondary entrapment device is attached, then the UL standard does not require a maximum obstruction force setting.

In some operator systems, if the end-user selects an operator model without the external secondary entrapment feature, then an input jumper switch is set to disable and the fifteen pound force threshold is used during barrier movement. If the end-user selects an operator model with the external secondary entrapment feature, then the input jumper is permanently enabled and the force threshold value is set at a higher value, typically twenty-five pounds. If the end-user desires to later add the external secondary entrapment feature, then the jumper must be physically moved from a disabled position to an enabled position. If the jumper is not moved to an enabled position then the external secondary entrapment feature will work, but the force threshold remains at fifteen pounds.

It has been found that the fifteen pound threshold is quite sensitive and as a result phantom obstructions are encountered. In other words, the operator falsely detects and reacts to a non-existent obstruction in the barrier's path. Such false detections may be the result of the wind, temperature, debris in the door track and the like. These false detections cause the barrier to reverse direction and require the user to wait unnecessarily for the barrier to complete its opening or closing cycle.

Other garage door operators incorporating a secondary inherent safety system allow the installer to add the secondary external safety system. Usually there is a "factory installed jumper" on a main motor control board of the operator that selects the external safety system. When the jumper is intact, the secondary external safety system is enabled and operational. Therefore, the secondary external safety system must be connected. Cutting the jumper and doing a pre-defined boot-up sequence removes the requirement for an external secondary safety system. Once this is done, however; the installer cannot replace or 'uncut' the jumper. The UL standard allows the external safety system to be installed on all door system types while the inherent safety system can only be used on specific door types (e.g. doors with pinch-resistant panels). And, since the external safety system is 'external' to the operator power head, it is exposed to easier damage (misaligned photo-electric sensors, damaged or cut wires, etc.). Thus, the external safety system and the operator power head act as a fail-safe system. If the external safety system is non-operational, the power head modifies its operation to try and prevent hazards (e.g. requires constant contact on a wall-control up/down button to close the door). Since the UL standard may require the external safety system for a specific door type, the simple act of disconnecting the external system safety systems does not allow an operator to automatically select the inherent safety system.

Another type of garage door operator allows two different types of external safety systems. One is a wired photo-electric sensor system and the other is the wireless photo-electric sensor system. The operator must determine which external safety system to use and have the ability to change from one type of safety system to the other. If a wired photo-electric sensor system is detected (connected and operational), then the operator remains in the wired safety system required setting. If no wired safety system is detected and then a wireless safety system is taught to the power head, then the operator changes to the wireless safety system required setting. If a wired safety system is now connected to the operator, the operator automatically changes to the wired safety system's required setting. Thus the operator has the ability to change from one type of external safety system to another type. But as in the previously discussed operator system, there is no provision for changing back to an internal secondary entrapment system. Accordingly, there is a need in the art for a method of enabling an operator to be re-programmed between different types of secondary safety systems.

DISCLOSURE OF INVENTION

It is thus an object of the present invention to provide a motorized operator system adaptable to accept different safety configurations and method for programming the same.

In general, the present invention contemplates a method for selecting a safety system used in conjunction with a motorized barrier operator comprising determining whether one type of a safety system is connected to the operator and selecting the one type of safety system if connected to the operator and selecting another type of the safety system if the one type of safety system is not connected to the operator.

The invention also contemplates a method for designating a safety system associated with a motorized barrier operator comprising providing a motorized barrier operator adaptable to different types of safety systems, providing the motorized barrier operator with a default safety system, and providing the motorized operator with a boot-up sequence to allow for selection of one of the default safety system and an optional safety system.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
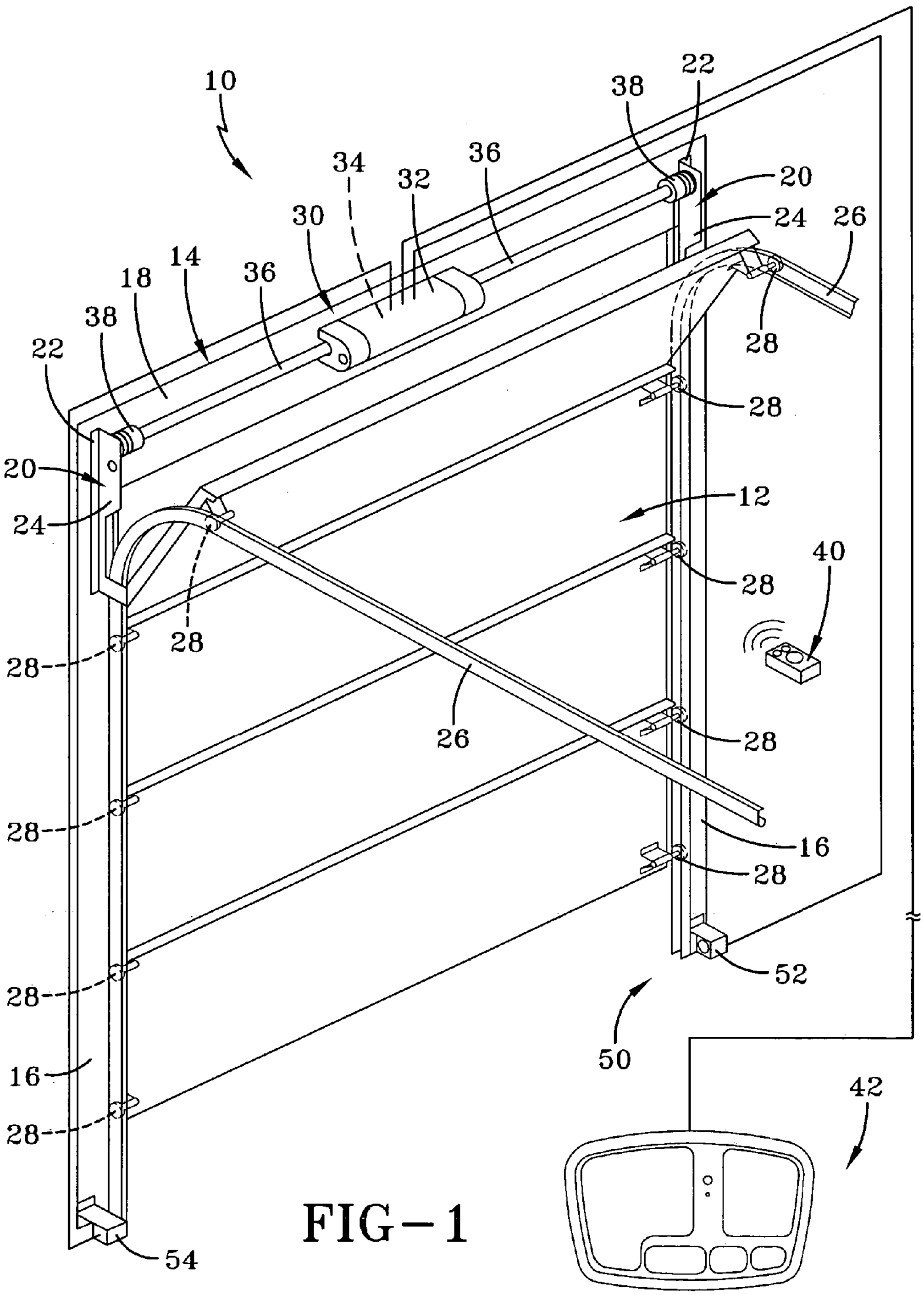
FIG. 1 is a fragmentary perspective view depicting a sectional garage door and showing an operating mechanism embodying the concepts of the present invention.

A motorized barrier operator adaptable to different safety configurations is generally indicated by the numeral 10 in FIG. 1 of the drawings. The system 10 is employed in conjunction with a conventional sectional garage barrier or door generally indicated by the numeral 12. The teachings of the present invention are equally applicable to other types of movable barriers such as single panel doors, gates, windows, retractable overhangs, and any device that at least partially encloses an area. The door 12 is most likely an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground (not shown). The jambs 16 are spaced and joined at their vertically upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
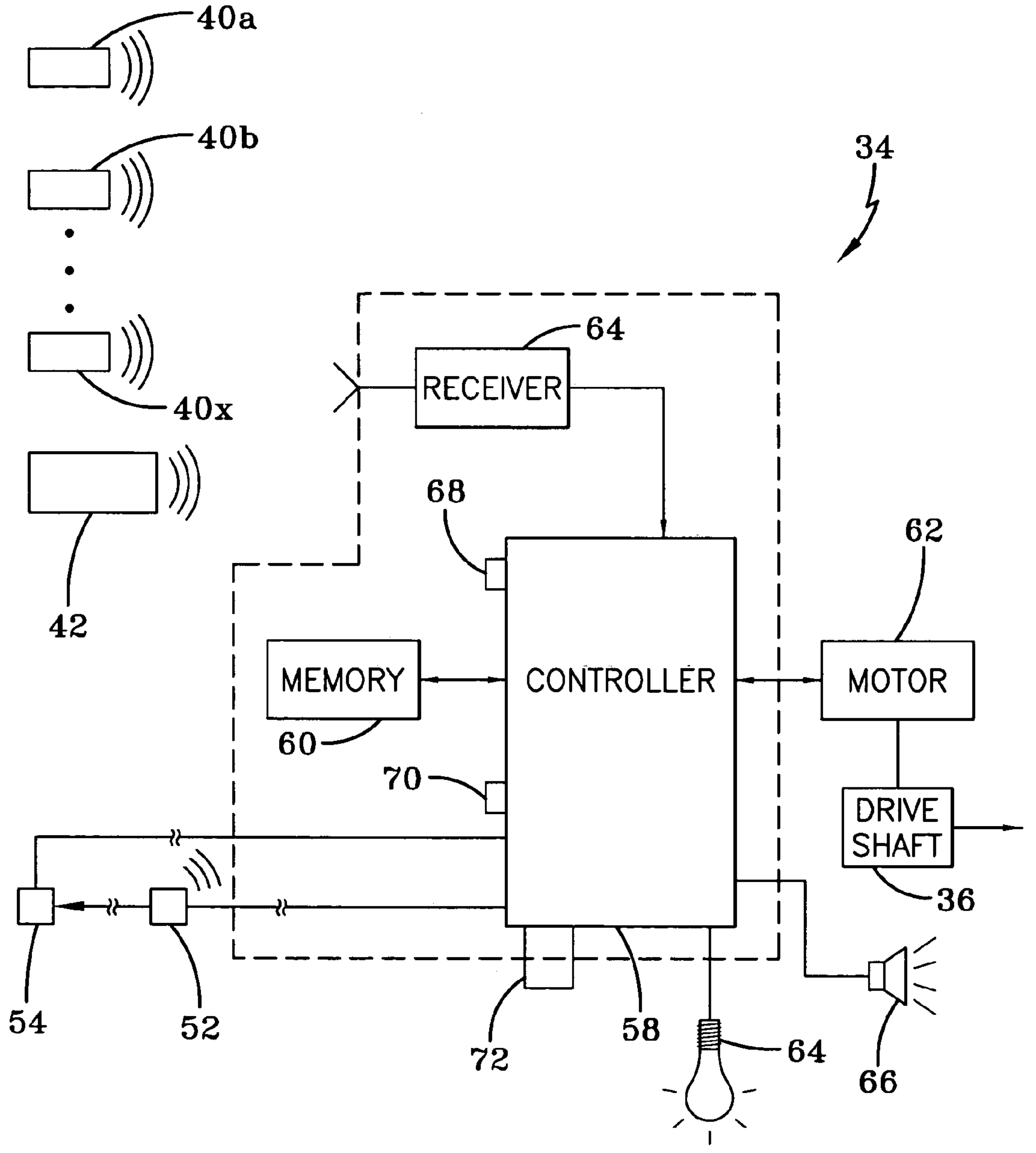
FIG. 2 is a schematic diagram of an operator mechanism.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism generally indicated by the numeral 34 as seen in FIG. 2. Extending from each end of the operator mechanism 34 is a drive shaft 36, the opposite ends of which are received by tensioning assemblies 38 that are affixed to respective projecting legs 24. Carried within the drive shaft 36 are counterbalance springs as described in the '010 patent. Although a header-mounted operator is specifically discussed herein, the control features to be discussed later are equally applicable to other types of operators used with movable barriers. This includes, but is not limited to, trolley, jackshaft, screw-type or other header-mounted operators.

In order to move the door from an open position to a closed position or vice versa, a remote transmitter 40, a wall station transmitter 42 or a keyless entry pad may be actuated. The remote transmitter 40 may use infrared, acoustic or radio frequency signals that are received by the operator mechanism to initiate movement of the door. Likewise, the wall station 42 may perform the same functions as the remote transmitter 40 and also provide additional functions such as the illumination of lights and provide other programming functions to control the manner in which the barrier is controlled. The wall station 42 may either be connected directly to the operator mechanism 34 by a wire or it may employ radio frequency or infrared signals to communicate with the operator mechanism 34. The wall station is preferably positioned within the line of sight of the barrier as it moves between positions.

An external secondary entrapment system, which is designated generally by the numeral 50, may be included with the system 10. In the preferred embodiment, the entrapment system 50 is a photoelectric sensor which has a sending device 52 and a receiving device 54. The sending device 52 is mounted to either the jamb 16 or the track 26 near the floor of the door area. The devices 52 and 54 are mounted at about 5 inches above the floor and on the inside of the door opening to minimize any interference by the sun. It will be appreciated that the position of the devices 52 and 54 may be positionally reversed if needed. In any event, the sending device 52 emits a visible, laser or infrared light beam that is detected by the receiver 54 which is connected to the operator mechanism 34. If an object interrupts the light beam during door travel, the receiver relays this information to a controller maintained in the operator mechanism which initiates the appropriate corrective action. In this way, if an object interrupts a light beam during a downward motion of the garage door, the motion of the door is at least stopped and/or returned to the opening position. It will be appreciated that other external secondary entrapment features or systems such as a contact-type safety edge on the bottom panel of the door could be used with the present invention.

Referring now to FIG. 2, it can be seen that the operator mechanism 34 employs a controller 58 which receives power from batteries or some other appropriate power supply. The controller 58 includes the necessary hardware, software, and a memory device 60 to implement operation of the operator 34. It will be appreciated that the memory device 60 may be integrally maintained within the controller 58. When either the remote transmitter 40 or wall station 42 is actuated, a receiver 64 receives the signal and converts it into a form useable by the controller 58. If a valid signal is received by the controller 58, it initiates movement of the motor 62 which, in turn, generates rotatable movement of the drive shaft 36 and the door is driven in the appropriate direction. The external secondary entrapment system 50, particularly the sending and receiving units 52, 54, are directly connected to the controller 58 to provide appropriate input. The entrapment system may be directly wired to the controller 58. In the alternative, a wireless transceiver could be associated with the receiving and sending units 52/54 for the purpose of communicating with the controller 58 without wires.

Other features of the system 10 may include a light 64 and an audio speaker 66. The light 64 may be toggled on and off by actuation of an appropriate button on the wall station 42 or upon initiation of barrier movement. And the light 64 or the speaker 66 may be used to indicate various programming modes of the controller. Such modes may be entered by pressing, or pressing and releasing a program button 68 that is operatively connected to the controller 58. Entering of a programming mode with the button 68 allows for the controller to enable and/or disable various safety features associated with the system 10. Or the programming mode may be entered by selective actuation of buttons on the wall station 42 or by other known means. As a part of the programming and learning of the safety features the system 10 may require the use of an internal jumper 70 and/or an external jumper 72. The jumpers or equivalent connections may be cut, removed or attached depending upon the desired safety feature to be associated with the controller. Indeed, the jumpers may be wire or some other type of connection as long as it provides a "shorting", or "non-shorting"function to indicate a desired use or non-use of a designated inherent or external safety system. The components of the operator mechanism and remote wireless components may be powered by a conventional residential power source and/or by batteries.

Figure 3:
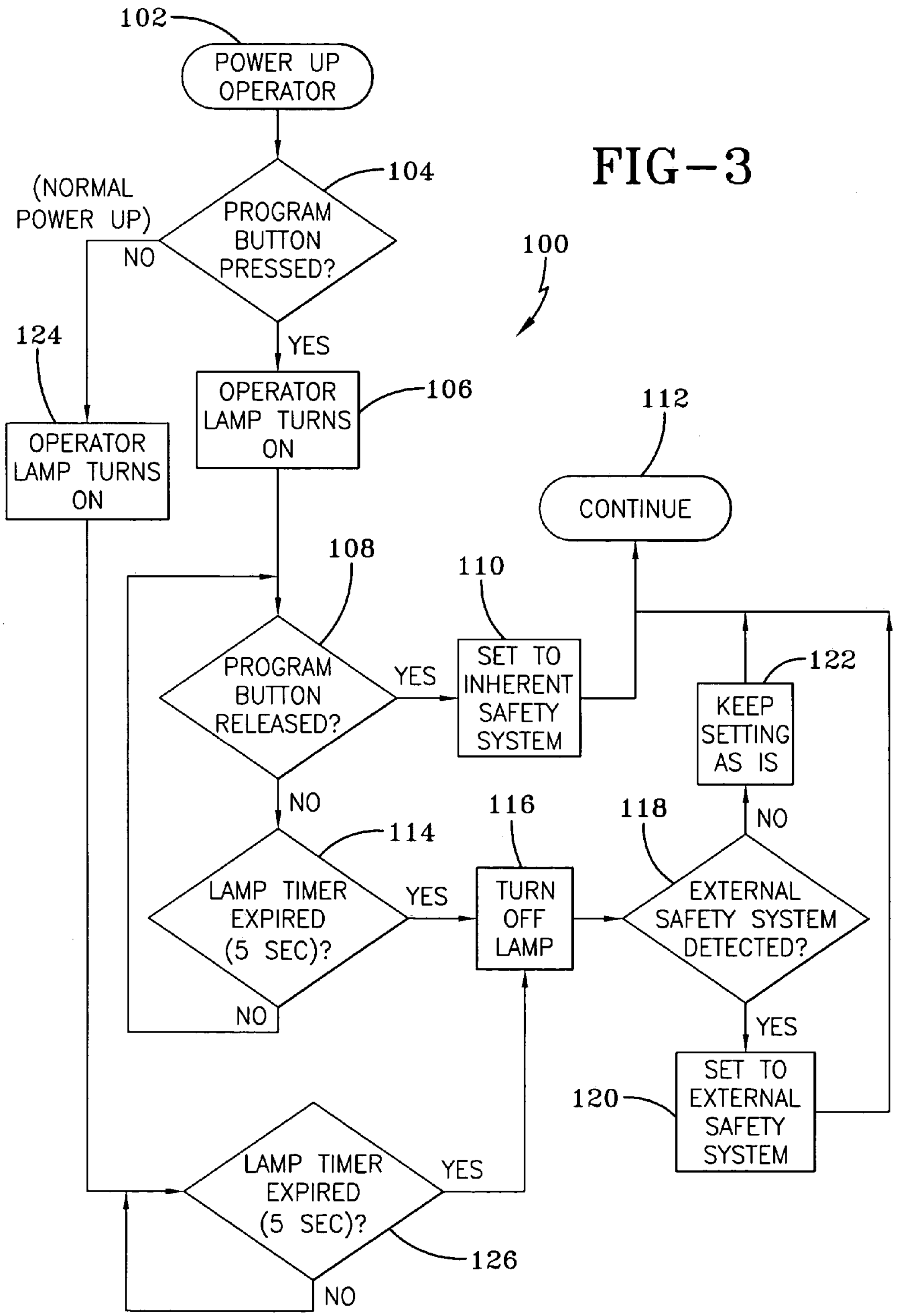
FIG. 3 is an operational flow chart employed by operator of the present invention for selecting secondary safety systems.

Referring now to FIG. 3, a flow chart, designated generally by the numeral 100 is representative of the software embodied and contained within the controller for determining the type of secondary entrapment feature to be associated with the operator mechanism 34 and in particular, whether a photo-electric sensor is to be associated or not with the controller. At step 102, power is supplied to the operator whereupon at step 104 the controller determines whether the program button 68 has been pressed or not. Immediately upon actuation of the program button at step 104, the operator turns the light 64 on at step 106. In the alternative, actuation of the program button may cause the speaker 66 to beep or emit a spoken command. In any event, at step 108 the controller 58 determines whether the program button 68 has been released or not. If the program button is released then the process continues on to step 110 and the controller 58 is set to an inherent safety system. In other words, the secondary entrapment features of the controller utilizes a secondary system that is inherent or internal to the controller 58 and as such an external safety entrapment device—such as the photo-electric sensors—is not utilized with the system 10. Accordingly, at step 112 the boot-up sequence is complete and the controller continues on with other operations related to the operation of the operator mechanism.

At step 108, if the program button is not released then the controller proceeds to step 114 to determine whether a lamp timer, which in the preferred embodiment is a five-second timer, has elapsed or not. If the timer has not yet expired, the process returns to repeat step 108 to determine the status of the program button. If at step 114, the lamp timer expires but the program button is still being pressed, in other words, the button has been pressed too long, then at step 116 the lamp 64 is turned off or an appropriate announcement is made by the speaker 66. Next, at step 118, the controller determines whether the external safety system, such as the photo-electric sensor, is detected and operational with respect to the controller 58. If an external safety system is detected at step 118, then the controller is set to utilize the external safety system at step 120 and then the process continues to step 112. If, however, at step 118 an external safety system is not detected then the process continues onto step 122 and the existing safety setting, which is typically an inherent or internal secondary entrapment feature, is maintained at step 122.

In the event of removal of power from the operator system and a normal power up scenario wherein the program button is not pressed at step 104, the process will proceed to step

124 and the operator lamp is turned on at step 124. The controller proceeds to step 126 to determine whether the lamp timer, which preferably runs for about five seconds, has expired or not. Once this lamp timer has expired the lamp is turned off and the process proceeds to step 116 and continues on with either steps 118, 120 or steps 118, 122. In this normal power-up scenario the operator returns to a default safety setting. In other words, if the system was initially set with an inherent system then it remains at the setting at step 122. But if the system detects that an external safety system is provided then the external safety system is set at step 120. Accordingly, in order to change the external safety system to an internal safety system specific steps must be taken to set the inherent safety system. In other words, the program button must be pressed and released in a predetermined period of time so as to utilize the inherent safety system provided within the control mechanism.

The advantages of this particular embodiment are readily apparent inasmuch as the system is able to detect the presence of an external safety system and automatically selects that system if available, and no positive steps are taken to implement the inherent safety system. Moreover, the operator control mechanism remains in the external safety system mode until the boot-up sequence is followed so as to change the controller to an inherent safety system. These features allow the manufacturer or installer to easily and quickly change the system between the external safety system and the inherent safety system. As such, this feature allows for the elimination of a jumper that is typically used to select either the external safety system or the inherent safety system. The operator control mechanism provides for a specific step-by-step procedure to be followed during the product's boot-up sequence to allow the manufacturer or the installer to force the garage door operator to change from an external safety system requirement to an inherent safety system requirement. For example, the operator may be shipped with the inherent safety system enabled and operational and as such no external safety system is connected and the operator mechanism ignores the external safety system requirement. However, if the operator does detect the connection of an operational external safety system, the operator automatically relies on the external safety system.

In summary, the use of jumpers is completely eliminated for determining what secondary safety system to use. Accordingly, accidental dislodging of the jumpers which may change a safety feature that is unwarranted or undesired, is prevented. This configuration also allows for easy changing of the safety systems if the need arises.

Figure 4:
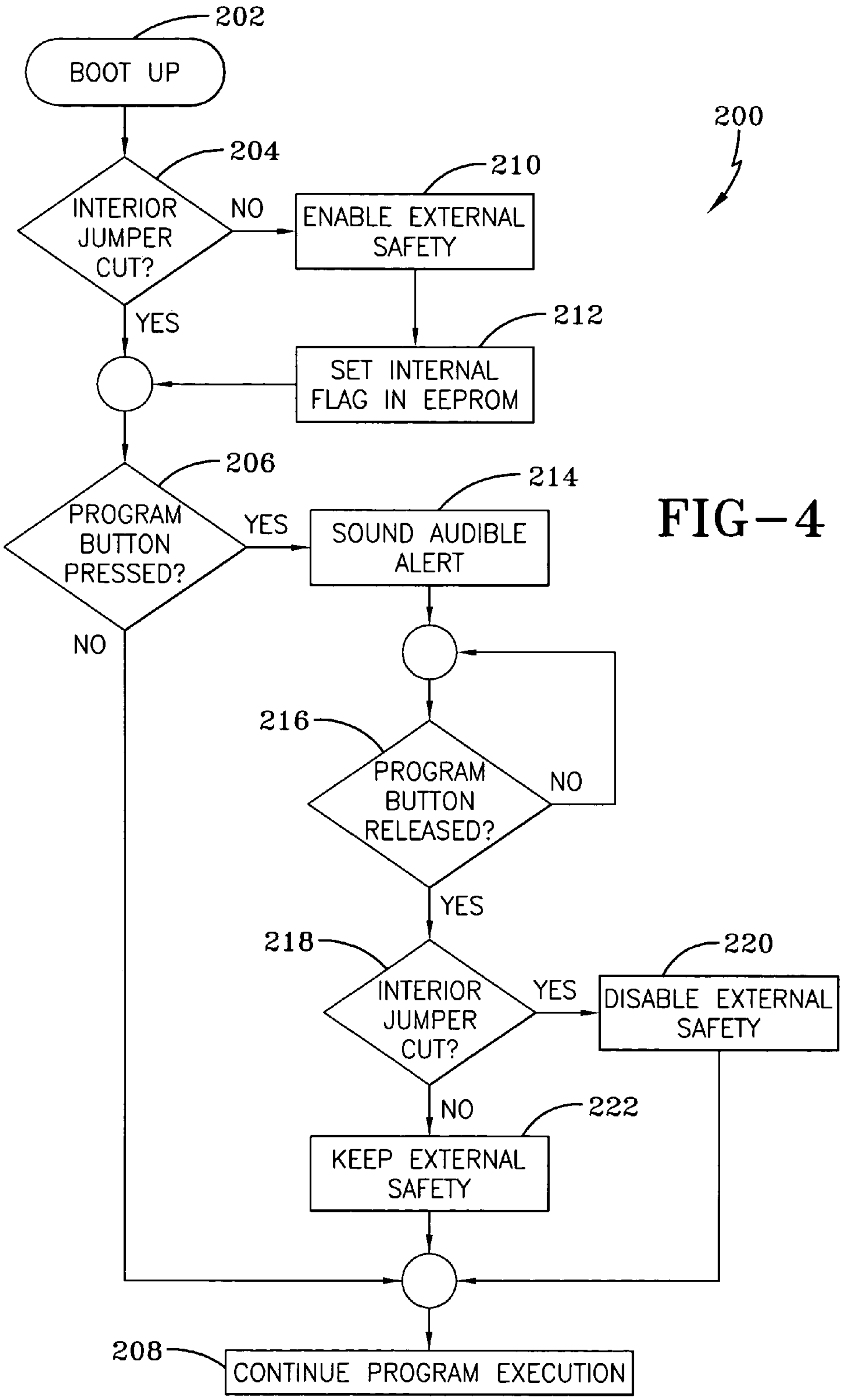
FIG. 4 is an operational flow chart employed the operator of the present invention for an alternative embodiment for enabling and/or disabling a secondary entrapment feature.
Figure 5A:
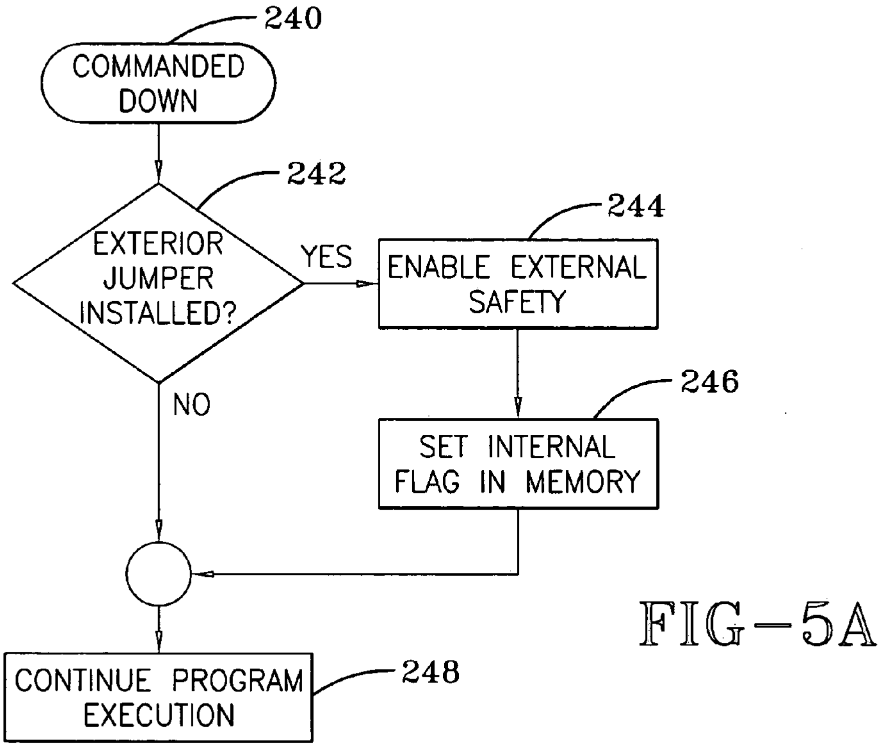
FIGS. 5A and 5B are operational flow charts indicating the operational sequence of the operator mechanism after the boot-up sequence shown in FIG. 4 has been implemented.
Figure 5B:
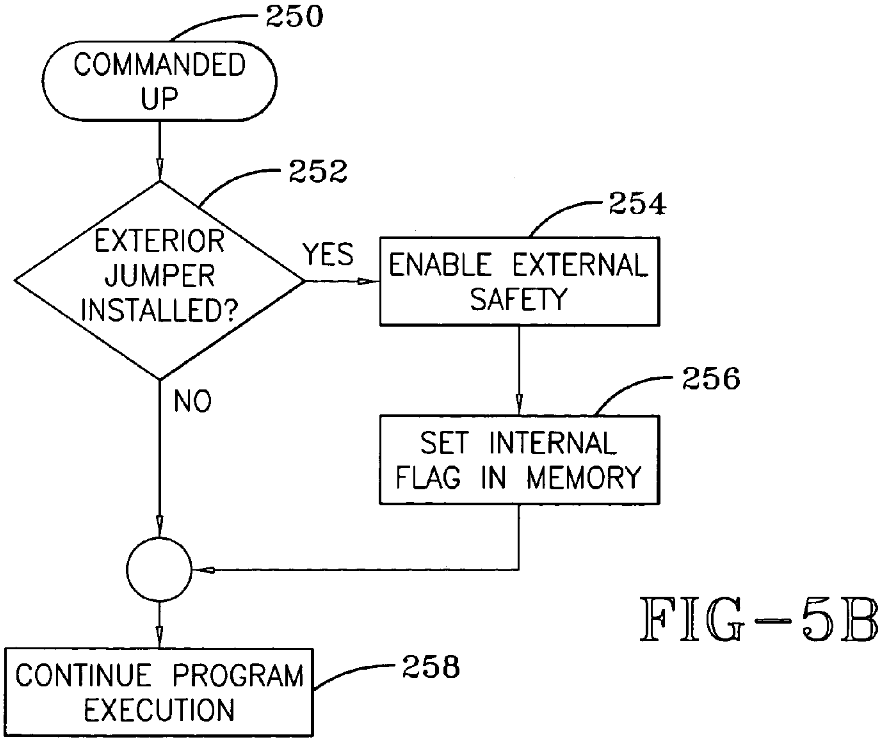

Referring now to FIGS. 4 and 5, an alternative to the above embodiment also permits user control and easy changing of the secondary entrapment safety features. In particular, FIG. 4 shows a flow chart, designated generally by the numeral 200, which is representative of software that may be embodied and contained within the controller for controlling the operator. Upon initial powering or "boot-up" of the operator at step 202, the controller mechanism, at step 204, determines whether the program button 68 has been pressed or not. If the program button has not been pressed then at step 206, the controller determines whether the internal or external jumper has been installed or not. If the internal jumper has been cut and if the external jumper has not been installed, then at step 208 the process proceeds with continued program execution at step 208. If, however, at step 206 it is determined that the internal jumper is intact or if the external jumper has been installed then the process proceeds to step 210 and the external safety device, if connected to the operator, is enabled. In other words, if a jumper is in place and the external system is provided then it is enabled on application of power to the operator system.

In the event of a change to the status of the external safety device it is determined that a change is desired, then at step 204 the user will press the program button 68 and upon actuation of the button an audible alert is sounded at step 212. Of course, other announcement mechanisms, such as a flashing light could be utilized to indicate actuation of the program button. In any event, at step 214 the controller awaits for a release of the program button. If the button has not been released, then step 214 is continuously repeated. It will be appreciated that a timer could be associated with the actuation of the program button so that if the program button is pressed for an extended period of time then the system simply does not allow for entering of any of the further steps and the program execution would continue at step 208. In any event, following step 214 and the release of the program button, the controller determines whether either of the jumpers are installed. In other words, if the internal jumper remains intact or the external jumper has been installed, then the process continues on to step 210 and the photo-electric sensors will be utilized as the external secondary entrapment feature. Upon enabling of the external device, the process continues to step 208. If, however, at step 216 it is determined that the internal jumper has been cut and the external jumper has not been installed, then at step 218 the photo-electric sensors are disabled and the process continues on to step 208.

The operational flow chart 200 is envisioned for use as the initial programming or installation sequence for connecting or not utilizing the photo-electric sensors or other related secondary entrapment features. It will be appreciated that cutting of the internal or interior jumper is a permanent act and once it is completed the interior jumper cannot be reconnected unless the operator mechanism is shipped back to the manufacturer's factory. To address this concern the user may attach and then later detach the external jumper 72

In the event the end user decides to change the initial installation of the operator mechanism and desires to use the internal secondary system when the external system is no longer operational or deemed ineffective, then use of the external jumper 72 may be employed. Accordingly, referring now to FIGS. 5A and 5B, the control mechanism may receive a barrier down operational signal at step 240. At this time, the controller determines whether the exterior jumper 72 is installed or not. If the exterior jumper is not installed then the program continues and it is presumed that the inherent internal safety feature is to be utilized. If however, at step 242 the exterior jumper is in place then the process continues on to step 244 wherein the external safety feature device is enabled and an appropriate flag is set in the memory 60 at step 246. The program then continues with operation at step 248 such that the secondary external safety device may send an appropriate signal to the controller if an obstruction is detected and the controller takes the appropriate corrective action.

The foregoing use of an interior and an exterior jumper is advantageous inasmuch as the ability to change between internal and external systems is simplified so that the only requirement to be enable a photo-electric sensor or a similar secondary entrapment feature is to attach or detach the exterior jumper. Indeed, the jumpers function much like a switch. The internal jumper may be used as a one-time switch, while the external jumper may be used as a multi-use switch. In any event, an elaborate sequence of programming steps is not required upon power up of the operator system. Such a system allows the end-user to force the barrier operator to remove or add an external safety requirement in addition to the inherent safety system operation. It also allows for the installer to force the garage door operator to change back to an external safety system at a later date in the event that the external system has been previously disabled.

If the operator is installed with the exterior jumper in place, then removing the jumper without the user boot-up sequence will not disable the requirement for an external non-contact safety system. As such, the exterior jumper can be added at any time before a door move command to enable the external safety mode. Accordingly, the end-user can easily and quickly change the product from an inherent safety system to the external safety system.

Thus, it should be evident that the method and device for increasing the allowed motor power of a motorized barrier operator disclosed herein carries out the various objects of the present invention set forth above and otherwise constitutes an advantageous contribution to the art. As will be apparent to persons skilled in the art, modifications can be made to the preferred embodiments disclosed herein without departing from the spirit of the invention. Therefore, the scope of the invention herein described shall be limited solely by the scope of the attached claims.

What is claimed is:

1. A method for selecting a safety system used in conjunction with a motorized barrier operator, comprising:

determining whether one type of a safety system is connected to the operator; and selecting said one type of safety system if connected to the operator and selecting another type of said safety system if said one type of safety system is not connected to the operator.

2. The method according to claim 1, further comprising:

pressing a program button connected to the operator;

releasing said program button within a predetermined period of time; and selecting by the operator of another type of said safety system.

3. The method according to claim 2, further comprising:

releasing said program button after said predetermined period of time; and selecting by the operator of said one type of safety system if connected to the operator.

4. The method according to claim 3, further comprising:

providing an indication that said program button has been pressed.

5. The method according to claim 4, further comprising:

removing said indication after elapsing of said predetermined period of time.

6. The method according to claim 5, wherein said indication is illumination of a lamp.

7. The method according to claim 5, wherein said indication is emitting of an audible sound.

8. A method for designating a safety system associated with a motorized barrier operator, comprising:

providing a motorized barrier operator adaptable to different types of safety systems;

providing said motorized barrier operator with a default safety system;

providing said motorized operator with a boot-up sequence to allow for selection of one of said default safety system and an optional safety system.

9. The method according to claim 8, further comprising:

detecting said optional safety system's connection to said motorized barrier operator.

10. The method according to claim 9, further comprising:

designating said optional safety system by said motorized barrier operator when said optional safety system is detected.

11. The method according to claim 10, further comprising:

providing a program button with said motorized operator, wherein actuation and release of said program button designates said default safety system for use with said motorized operator.

12. The method according to claim 11, wherein said motorized operator requires actuation of said program button on power-up and release of said program button within a predetermined period of time for designation of said default safety system.

13. The method according to claim 11, wherein said motorized operator reverts to designation of said optional safety system only at power-up and detection of said optional safety system.

14. The method according to claim 11, wherein said motorized operator reverts to designation of said optional safety system on power-up and holding of said program for a predetermined period of time.

15. The method according to claim 8, further comprising:

providing said motorized operator with a pre-installed jumper; and detecting said optional safety system's connection to said motorized barrier operator.

16. The method according to claim 15, further comprising:

designating said optional safety system when said optional safety system is detected and said pre-installed jumper is intact.

17. The method according to claim 15, further comprising:

designating said default safety system when said pre-installed jumper is cut.

18. The method according to claim 17, further comprising:

providing a program button with said operator, wherein actuation of said program button with said pre-installed jumper intact maintains said optional safety system.

19. The method according to claim 17, further comprising:

providing a program button with said operator, wherein actuation of said program button and cutting of said pre-installed jumper disables said optional safety system.

20. The method according to claim 19, further comprising:

providing an external jumper mount; and checking for the presence of a connection of an external jumper across said external jumper mount.

21. The method according to claim 20, further comprising:

enabling said optional safety system upon detection of the presence of said external jumper.

22. The method according to claim 20, further comprising:

performing said checking step each time said motorized operator receives a barrier movement command.

* * * * *